G. H. MEIER.
Devices for Releasing Horses from Carts.

No. 140,521. Patented July 1, 1873.

Attest:
Jas. H. Layman.
Walter Allen.

George Henry Meier
By Knight Bro Att'ys

UNITED STATES PATENT OFFICE.

GEORGE H. MEIER, OF CINCINNATI, OHIO.

IMPROVEMENT IN DEVICES FOR RELEASING HORSES FROM CARTS.

Specification forming part of Letters Patent No. 140,521, dated July 1, 1873; application filed May 22, 1873.

*To all whom it may concern:*

Be it known that I, GEORGE HENRY MEIER, of Cincinnati, Hamilton county, Ohio, have invented a new and useful Device for Releasing Horses from Carts, of which the following is a specification:

This invention relates to a simple and effective appliance wherewith a horse can be instantly detached from a cart; and the device is designed more especially to prevent the animal being dragged down an embankment or into an excavation whenever the vehicle is backed over the "dump-stick," as hereinafter more fully described.

Figure 1:
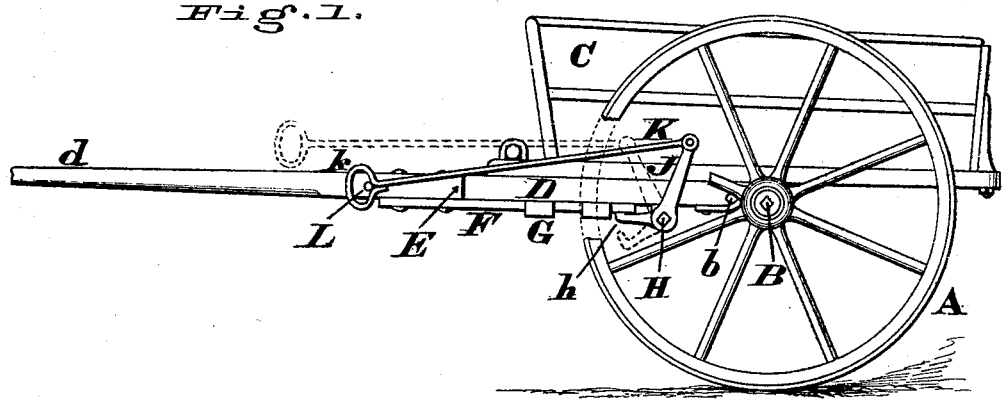
Figure 2:
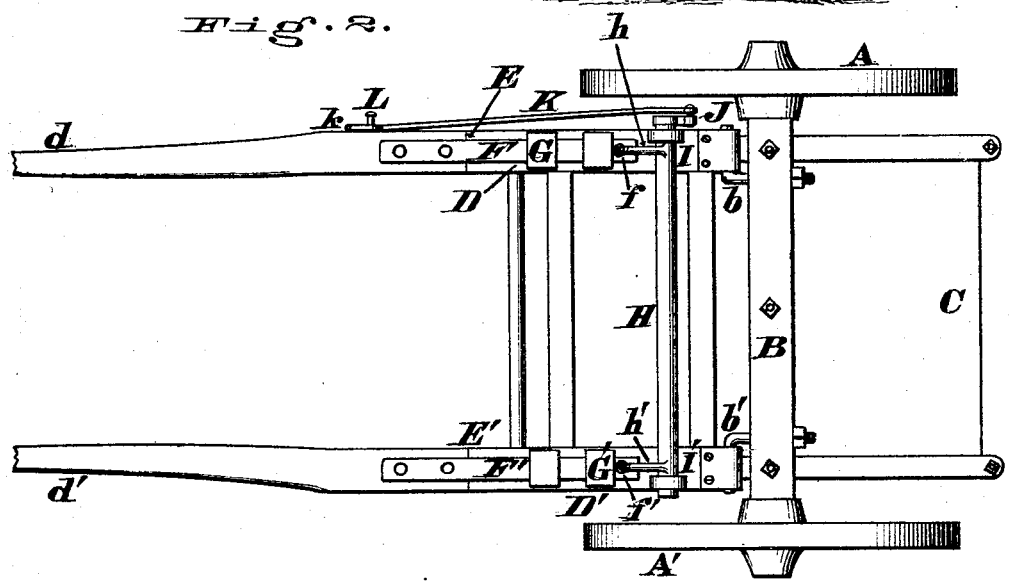
Figure 3:
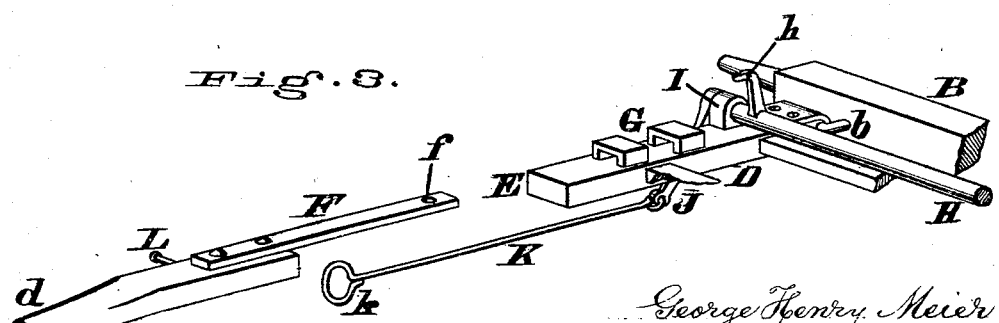

Figure 1 is a side elevation of a cart provided with my releasing device, a portion of one of the ground-wheels of the vehicle being broken away. Fig. 2 is a plan, showing the under side of the cart and its accessories. Fig. 3 is a perspective view, showing one of the shafts detached from the vehicle.

A A′ represents the ground-wheels; B, the axle; and C, the body or bed of a cart of any approved construction. Connected to the axle B, by the customary hooks $b\ b'$, are the shafts or thills D D′ $d\ d'$. These shafts are divided at E E′, and the horse is hitched to the outer portions $d\ d'$. Secured to the under sides of the shafts $d\ d'$, and near the rear ends of the same, are stout metallic straps or bars F F′, which are adapted to traverse the staples or boxes G G′, the latter being secured to the portions D D′ of said shafts. The rear ends of the straps F F′ are provided with apertures or eyes $f\ f'$, for the reception of hook-shaped lugs $h\ h'$ that project laterally from a rock-shaft, H. This rock-shaft is journaled in bearings I I′ that are secured to the rear portions D D′ of the thills. Secured to the rock-shaft is an arm, J, to whose free end a rod, K, is pivoted, which rod terminates in a handle, $k$, that is adapted to engage over a pin, L, which projects from one of the detachable portions $d$ or $d'$ of the thills.

When in their normal position the straps F F′ traverse the staples G G′, the hook-shaped lugs $h\ h'$ enter the apertures $f\ f'$, and the handle $k$ engages over the pin L, thereby securely coupling the detachable portions $d\ d'$ of the shafts to the fixed portions D D′, as shown in Figs. 1 and 2.

It will be readily understood that, owing to this arrangement of the operative parts, the stress of the animal upon the shafts $d\ d'$ has a tendency to press the handle $k$ against the pin L, instead of away from it, and, consequently, there is no danger of accidental unshipment of the releasing mechanism.

Whenever the horse backs the cart over the "dump-stick," and there is danger of the animal being dragged down an embankment or into an excavation, the driver has only to disengage the handle $k$ from the pin L, and draw the rod K forward to the position shown by dotted lines in Fig. 1. By this simple and momentary act the rock-shaft H is turned within its bearings in such a manner as to disengage its hook-shaped lugs $h\ h'$ from the apertures $f\ f'$ of the straps F F′, thereby instantly releasing the shafts $d\ d'$ from the portions D D′, and allowing the cart to descend without dragging the horse down after it.

I claim—

In combination with the axle B $b\ b'$, the divided shafts D D′ $d\ d'$ E E′, straps F F′ $f\ f'$, staples G G′, rock-shaft H $h\ h'$ J, and retaining devices K $k$ L, or their mechanical equivalents, for the object herein described.

In testimony of which invention I hereunto set my hand.

GEORGE H. MEIER.

Attest:
GEO. H. KNIGHT,
H. SCHOONMAKER.